Patented Jan. 11, 1927.

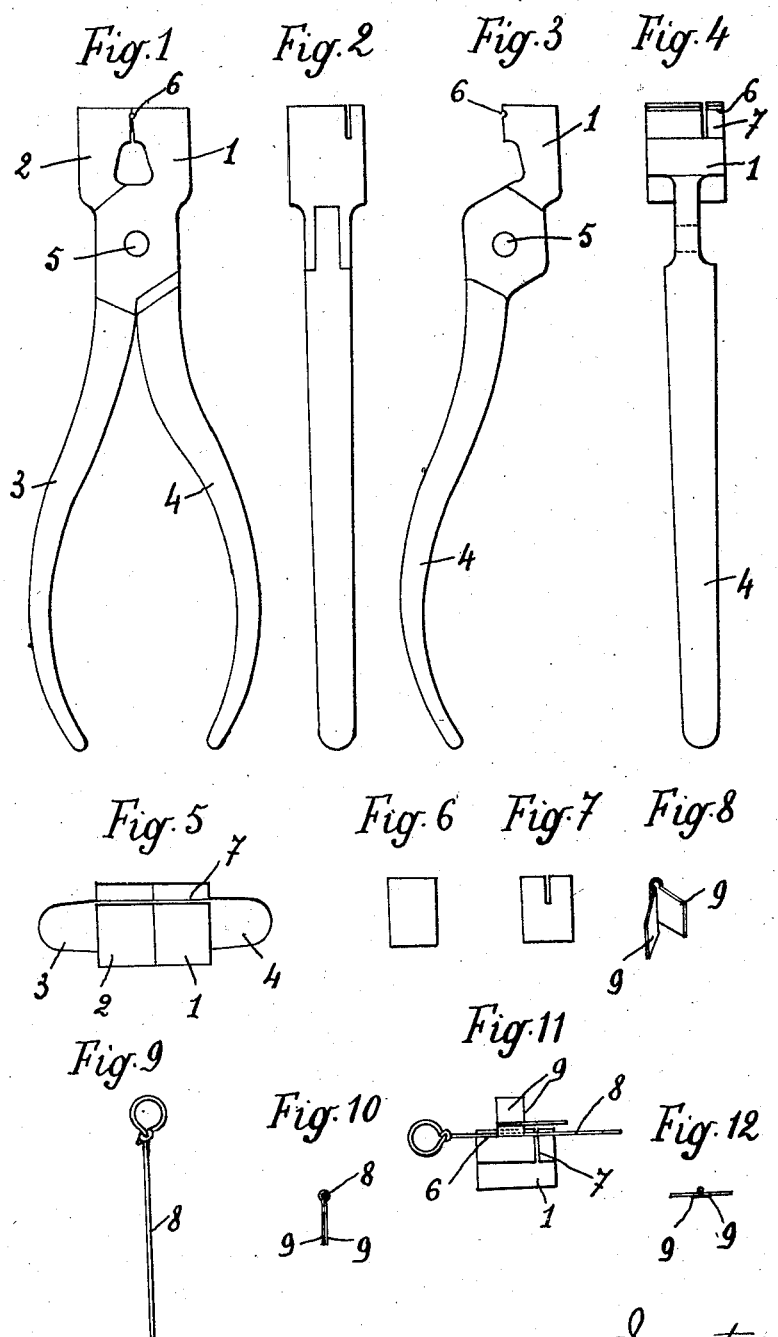

1,614,380

UNITED STATES PATENT OFFICE.

EDMOND MOISAN, OF PARIS, FRANCE.

FORCEPS FOR USE IN THE MANUFACTURE OF PLATES USED IN DENTAL PROSTHESIS.

Application filed October 4, 1924, Serial No. 741,696, and in France October 26, 1923.

All the devices actually in use for the production of pivot plates employed in dental prosthesis and allowing for the interchange of the teeth have involved a large number of elements. Their general use was therefore impossible.

Although more simple apparatus have been designated to replace the said devices, they have up to the present time rendered the use of a vise indispensable, thus preventing their immediate use, and limiting their field of application.

The present invention relates to portable forceps, enabling the pivot plates used in dental prosthesis to be rapidly obtained, and giving them the accuracy necessary for the interchangeability of the teeth on the pivot.

The accompanying drawing shows, by way of example, one constructional embodiment of the invention.

Fig. 1 is an elevation of the forceps.
Fig. 2 is a side view of same.
Fig. 3 is an elevation showing one of the jaws of the forceps and the lever connected thereto.
Fig. 4 is a front view of Fig. 3.
Fig. 5 is a plan of Fig. 1.
Figs. 6 to 12 illustrate various stages in the formation of a pivot plate.

The forceps properly so called, comprise two jaws 1 and 2, integral with the levers 3 and 4, having a common pivot pin 5.

The plane contact surfaces of the jaws comprise straight recesses or grooves 6, adapted to come opposite one another when the tool is closed.

The said grooves or recesses co-operate in the formation of the pivot in the plate.

7 is a straight cut or slot, see Figs. 2, 4 and 5, extending transversely across the jaws i. e., perpendicular to the meeting faces of the jaws as shown and for the purpose hereinafter mentioned.

The method of using the tool is as follows:

In the first place a metallic plate is taken, which is usually of gold, rectangular in shape, and of appropriate size and thickness, see Fig. 6. This plate is gripped between the jaws of the tool, so that its extremity is level with the edges of the tool, and so that the middle portion of the edge of the plate corresponds to the cut or trench 7. When thus in position, a cut is made by means of a saw, producing a slotted plate as shown in Fig. 7.

After this another metallic plate is taken and partially folded over as shown at Fig. 8, a pin such as that illustrated at 8, Fig. 9, being inserted at the fold. This plate is then placed in the jaws of the tool, with the pin 8 in the grooves or channels 6 and the free edges of the plate projecting at the outside of the jaws. The tool is then closed and the pivot joint shown at Fig. 10 is obtained. The edges 9, whilst still in contact, with the pin in position in the tool, have then the plate shown at Fig. 7 engaged over them in the manner illustrated at Fig. 11, and then the edges 9 are turned back flat on each side onto the plate as shown at Fig. 12.

The whole device is then removed from the tool the pin 8 is withdrawn and the two parts, pivot element and plates soldered lightly together.

It is to be understood that other constructional embodiments may be made, without departing from the principle of the invention.

I claim—

1. A tool for making plates used in dental prosthesis, comprising a pair of pivoted contacting jaws each having a handle extension, registering grooves in the contacting faces of the jaws, and a saw-guide slot in the jaws substantially perpendicular to the meeting faces of the jaws.

2. A tool for making plates used in dental prosthesis, comprising a pair of pivotally connected, contacting jaws each having a handle extension, and a saw guide slot extending across the ends of both jaws perpendicular to the meeting faces of the jaws, whereby a metal blank may be held between the jaws and a cut made therethrough perpendicular to its surface by a saw guided in said slot.

In testimony that I claim the foregoing as my invention, I have signed my name.

EDMOND MOISAN.